United States Patent
Bai et al.

(10) Patent No.: US 12,504,924 B2
(45) Date of Patent: Dec. 23, 2025

(54) TECHNIQUES FOR EFFICIENTLY HANDLING MISALIGNED SEQUENTIAL READS

(71) Applicant: Micron Technology, Inc., Boise, ID (US)

(72) Inventors: Xiang Bai, Shanghai (CN); Lingyun Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 213 days.

(21) Appl. No.: 17/758,331

(22) PCT Filed: Mar. 17, 2022

(86) PCT No.: PCT/CN2022/081442
§ 371 (c)(1),
(2) Date: Jul. 1, 2022

(87) PCT Pub. No.: WO2023/173361
PCT Pub. Date: Sep. 21, 2023

(65) Prior Publication Data
US 2024/0192887 A1    Jun. 13, 2024

(51) Int. Cl.
*G06F 3/06* (2006.01)
(52) U.S. Cl.
CPC .......... *G06F 3/0659* (2013.01); *G06F 3/0611* (2013.01); *G06F 3/0688* (2013.01); *G06F 2212/7207* (2013.01)

(58) Field of Classification Search
CPC .... G06F 3/0659; G06F 3/0611; G06F 3/0688; G06F 2212/7207
See application file for complete search history.

(56) References Cited

U.S. PATENT DOCUMENTS

| 9,032,162 B1* | 5/2015 | Chang | G06F 13/161 |
| | | | 711/149 |
| 9,355,022 B2* | 5/2016 | Ravimohan | G06F 3/0679 |
| 2009/0172257 A1* | 7/2009 | Prins | G06F 3/0659 |
| | | | 711/E12.008 |

(Continued)

OTHER PUBLICATIONS

"International Search Report and Written Opinion of the International Searching Authority," issued in connection with Int'l Appl. No. PCT/CN22/081442, dated Nov. 28, 2022 (9 pages).

*Primary Examiner* — Kalpit Parikh
(74) *Attorney, Agent, or Firm* — Holland & Hart LLP

(57) ABSTRACT

Methods, systems, and devices for techniques for efficiently handling misaligned sequential reads are described. A memory system may include a memory device that includes multiple memory dies. The memory system may receive a first read command and a second read command from a host system. The first read command may be associated with a first set of physical addresses and the second read command may be associated with a second set of physical addresses. The memory system may determine, based on the first set of physical addresses and the second set of physical addresses, that the first read command and the second read command are for a same memory die of the multiple memory dies. The memory system may then transmit to the memory die a read request that indicates the first set of physical addresses and the second set of physical addresses.

26 Claims, 6 Drawing Sheets

(56) References Cited

U.S. PATENT DOCUMENTS

| | | | |
|---|---|---|---|
| 2016/0283111 A1* | 9/2016 | Guo | G06F 3/0655 |
| 2018/0232325 A1 | 8/2018 | Choi et al. | |
| 2019/0087126 A1* | 3/2019 | Chun | G06F 3/0611 |
| 2021/0019182 A1 | 1/2021 | Duong et al. | |
| 2022/0129378 A1* | 4/2022 | McJilton | G06F 3/0679 |

* cited by examiner

TECHNIQUES FOR EFFICIENTLY HANDLING MISALIGNED SEQUENTIAL READS

CROSS REFERENCE

The present application for patent is a 371 national phase filing of International Patent Application No. PCT/CN2022/081442 by Bai et al., entitled "TECHNIQUES FOR EFFICIENTLY HANDLING MISALIGNED SEQUENTIAL READS," filed Mar. 17, 2022, assigned to the assignee hereof, and expressly incorporated by reference herein.

FIELD OF TECHNOLOGY

The following relates to one or more systems for memory, including techniques for efficiently handling misaligned sequential reads.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A memory system may include a controller that facilitates front-end operations for the memory system and a memory device that facilitates back-end operations for the memory system. For example, the controller may facilitate interactions between the memory system and a host system, and the memory device may facilitate memory access operations as instructed by the controller.

In some cases, the memory system may receive sequential read commands from the host system, where a sequential read command is a read command that indicates or includes numerically sequential logical addresses. The logical addresses indicated by a sequential read command may be mapped to physical addresses that span multiple memory dies, so the controller may transmit to the memory device an internal read request for each memory die indicated by a sequential command. But in some cases, two sequential read commands may be misaligned, which refers to the scenario where the sequential read commands indicate logical addresses that are mapped to physical addresses on the same memory die. In such a scenario, the controller may transmit to the memory device multiple internal read requests for the same memory die, which may increase processing and latency of the memory system, among other disadvantages.

According to the techniques described herein, a controller that receives misaligned sequential read commands may determine that the sequential read commands are misaligned and transmit a single read request for the memory die involved in the misalignment. For example, upon receipt of a sequential read command that indicates logical addresses mapped to physical addresses in a portion of a memory die (as opposed to mapped to physical addresses for the entire memory die), the controller may prefetch the next sequential read command and check if that read command indicates logical addresses mapped to physical addresses in another portion of the same memory die as the initial sequential read command. If so, the controller may transmit to the memory device a single read request that indicates the physical addresses mapped to the logical addresses of both of the misaligned read commands. Thus, the controller may improve system efficiency and latency by recognizing misaligned read commands and merging the physical addresses associated with the misaligned read commands into a single read request.

Figure 1:
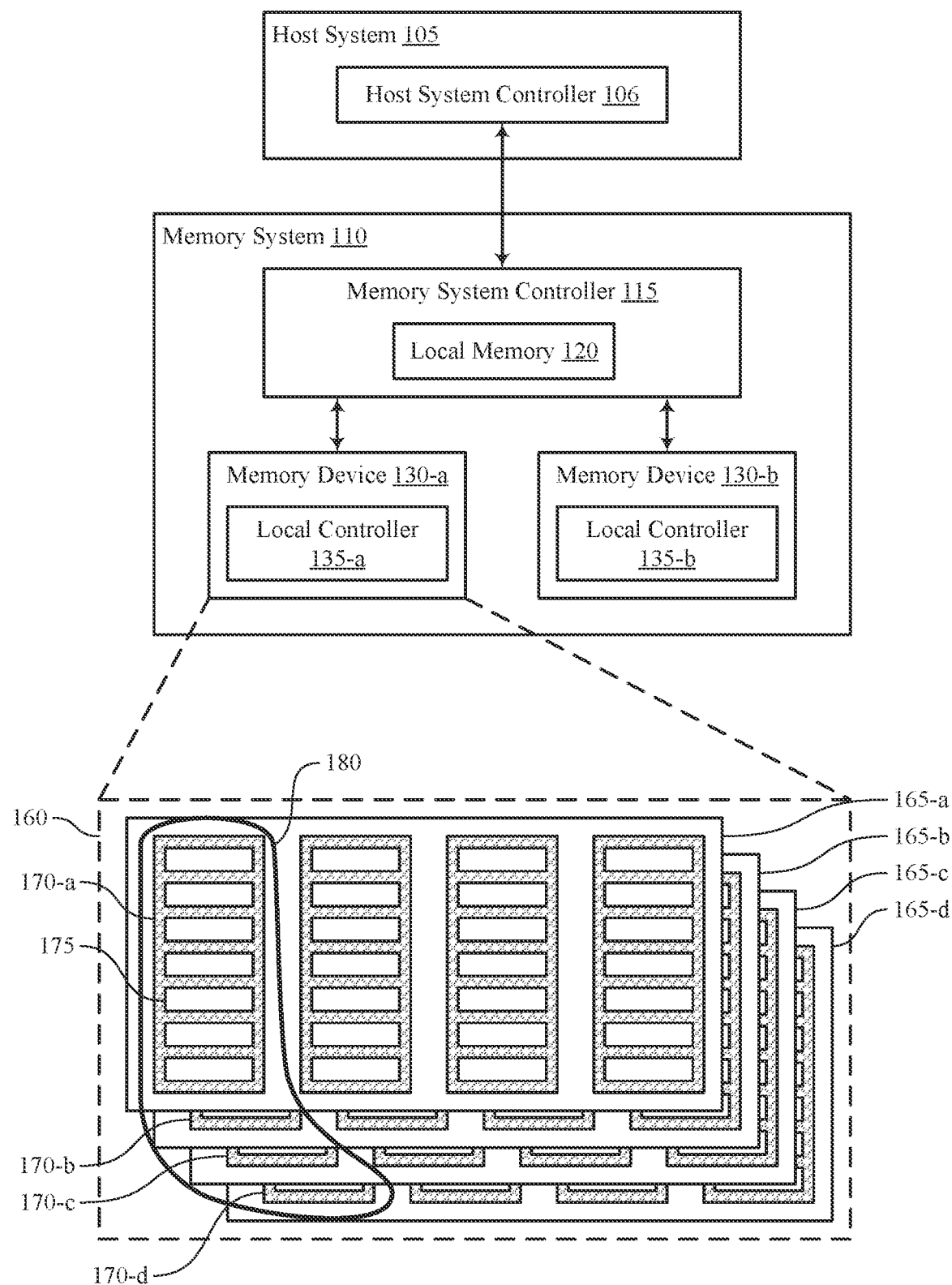
FIG. 1 illustrates an example of a system that supports techniques for efficiently handling misaligned sequential reads in accordance with examples as disclosed herein.
Figure 2:
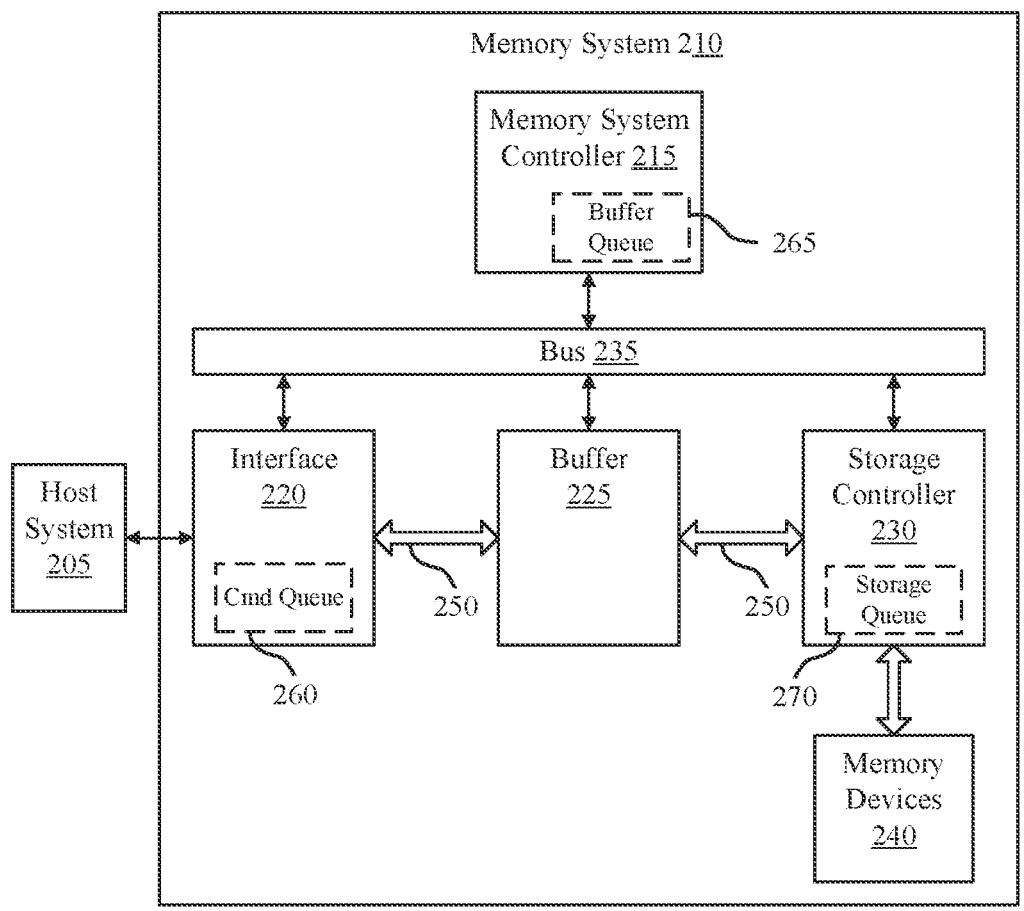
FIG. 2 illustrates an example of a system that supports techniques for efficiently handling misaligned sequential reads in accordance with examples as disclosed herein.

Features of the disclosure are initially described in the context of systems, devices, and circuits with reference to FIGS. 1 through 2. Features of the disclosure are described in the context of a memory system and a process flow with reference to FIGS. 3 and 4. These and other features of the disclosure are further illustrated by and described in the context of an apparatus diagram and flowchart that relate to techniques for efficiently handling misaligned sequential reads with reference to FIGS. 5 and 6.

FIG. 1 illustrates an example of a system 100 that supports techniques for efficiently handling misaligned sequential reads in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support techniques for efficiently handling misaligned sequential reads. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The memory system controller 115 may receive different types of read commands from the host system 105. For example, the memory system controller 115 may receive non-sequential read commands and sequential read commands. A non-sequential read command may indicate or include a set of logical addresses that are not numerically sequential, whereas a sequential read command may indicate or include a range of logical addresses that are numerically sequential. In response to a sequential read command, the local system controller 115 may generate a set of read requests for transmission to a memory device 130. A sequential read command may be larger (e.g., indicate more data) than a read request, so the memory system controller 115 may generate multiple read requests per sequential read command. For example, if a sequential read command is for 512 kB and a read request is for 64 kB, the memory system controller 115 may generate eight read requests per sequential read command. The amount of data indicated by a read request may vary between 4 kB and the size of a memory die (e.g., 64 kB).

As referred to herein, a read command may refer to a command for reading data that is transmitted to the memory system 110 from a device or component external to the memory system 110. For example, read commands may be commands for reading data that are transmitted by the host system 105 to the memory system 110. As referred to herein, a read request may refer to command for reading data that is internally transmitted between components of the memory system 110. For example, a read request may be request for reading data that is transmitted by the memory system controller 115 to a memory device 130. Transmission of a signal may refer to communication of the signal between two devices (e.g., between the host system 105 and the memory system 110) or communication of the signal between two components within the same device (e.g., between the memory system controller 115 and a memory device 130). In some examples, a read command may be referred to as a frontend (FE) read command or an external read command and a read request may be referred to as a backend (BE) read request or an internal read request, among other suitable terminology.

Use of sequential read commands may reduce the latency of address translation relative to other techniques (e.g., because fewer L2P tables, which are arranged in sets of numerically sequential logical addresses, may be loaded into the local memory 120 for address translation), among other advantages. But in some cases, the logical addresses mapped to a memory die may be split between two sequential read commands (e.g., in a misalign scenario), which cause a memory system controller to issue multiple (e.g., two) read requests for the same memory die. Issuing multiple read requests to a same memory die may be inefficient and may negatively impact the performance of the system.

According to the techniques described herein, the memory system 110 may improve performance by detecting misaligned sequential read commands for a memory die and merging physical addresses from the misaligned sequential read commands into a single read request for the memory die. Thus, in a misalignment scenario the memory system 110 may issue a single read request to the memory die, rather than two or more read requests, which may reduce processing overhead and latency relative to other techniques, among other benefits.

FIG. 2 illustrates an example of a system 200 that supports techniques for efficiently handling misaligned sequential reads in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225.

That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some cases, the memory system 210 may receive misaligned sequential read commands. To improve system performance relative to other techniques, the memory system controller 215 may be configured to identify misaligned reads so that the memory system controller 215 can issue a single read request for the memory die associated with the misalignment.

The memory system controller 215 may detect a potential misalignment by determining that physical addresses associated with a sequential read command covers a portion of a memory die (as opposed to covering the entire memory die). Upon making such a determination, the memory system controller 215 may prefetch the next sequential read command from a queue (e.g., the command queue 260) and, if that sequential read command also covers a portion of the same memory die, may detect a misalignment. In response to detecting the misalignment, the memory system controller 215 may combine the physical addresses for the memory die from the misaligned read commands and issue a single read request to a memory device 240 with the combined physical addresses.

Thus, in a misalignment scenario the memory system 210 may issue a single read request for the memory die, rather than two or more read requests, which may reduce processing overhead and latency relative to other techniques, among other benefits.

Figure 3:
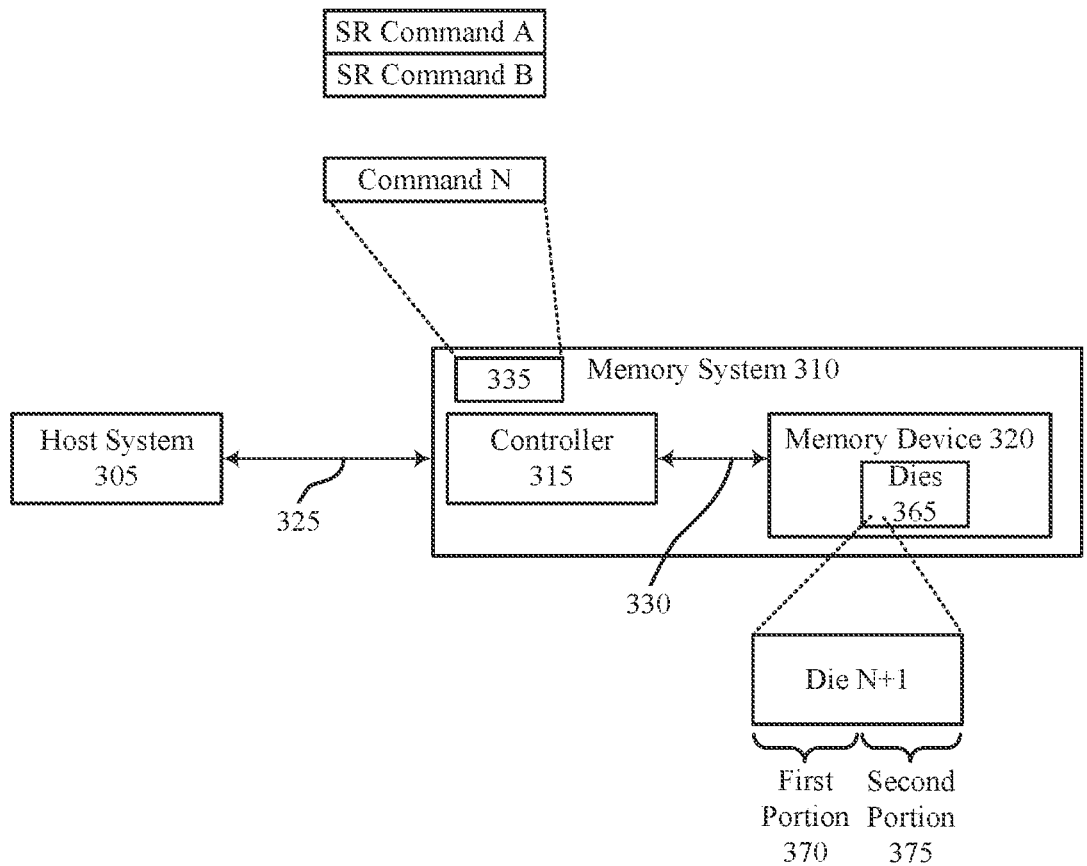
FIG. 3 illustrates an example of a system that supports techniques for efficiently handling misaligned sequential reads in accordance with examples as disclosed herein.

FIG. 3 illustrates an example of a system 300 that supports techniques for efficiently handling misaligned sequential reads in accordance with examples as disclosed herein. The system 300 may be an example of a system 100 or a system 200 as described with reference to FIGS. 1 and 2, respectively. The system 300 may include a host system 305, which may be an example of a host system 105 or a host system 205 as described with reference to FIGS. 1 and 2, respectively. The system 300 may also include a memory system 310, which may be an example of a memory system 110 or a memory system 210 as described with reference to FIGS. 1 and 2, respectively. The controller 315 may identify misaligned read commands and consolidate physical addresses associated with the misaligned read commands into a read request for the memory device.

The controller 315 may be configured to facilitate interactions with the host system 305 and to facilitate memory access operations by the memory device 320. So, the controller 315 may be coupled with the host system 305 via interface 325 and may be coupled with the memory device 320 via the interface 330. The controller 315 may also be coupled with queue 335, which may be a buffer or other storage component configured to store commands from the host system 305. The controller 315 may be an example of the memory system controller 115 as described with reference to FIG. 1 or the memory system controller 215 as described with reference to FIG. 2.

The controller 315 may receive memory access commands, such as read commands, from the host system 305 and add the memory access commands to the queue 335. For example, the controller 315 may receive sequential read (SR) command A followed by SR command B. Thus, SR command A may be received back-to-back with SR command B. The controller 315 may add SR command A and SR command B to the queue 335.

SR command A may indicate or include numerically sequential logical addresses for a set of memory dies, some or all of which may be included in the dies 365 of memory device 320. For example, SR command A may indicate: sequential logical addresses that are mapped to physical addresses for die 0, sequential logical addresses that are mapped to physical addresses for die N, and sequential logical addresses that are mapped to die N+1, among others. SR command B may also indicate or include numerically sequential logical addresses for a set of memory dies, some or all of which may be included in the dies 365 of memory device 320. For example, SR command B may indicate: sequential logical addresses that are mapped to physical addresses for die N+1, sequential logical addresses that are mapped to physical addresses for die N+2, and sequential logical addresses that are mapped to die 2N, among others.

The controller 315 may communicate one or more read requests per SR command. For example, for SR command A the controller 315 may communicate a read request 340 and a read request 345 to memory device 320. Read request 340 may request data from die 0 and indicate physical addresses in die 0 and read request 345 may request data from die N and indicate physical addresses in die N. For SR command B, the controller 315 may communicate a read request 355 and a read request 360 to the memory device 320. Read request 355 may request data from die N+2 and indicate physical addresses in die N+2 and read request 360 may request data from die 2N and indicate physical addresses in die 2N. The controller 315 may determine the physical addresses associated with an SR read command by using an L2P address table that maps logical addresses to physical addresses.

In some examples, SR command A and SR command B may be misaligned in that SR command A and SR command B are each associated with the same memory die. For example, SR command A may indicate logical addresses that are mapped to physical addresses that cover a first portion 370 of die N+1, whereas SR command B may indicate logical addresses that are mapped to physical addresses that cover a second portion 375 of die N+1. According to the techniques described herein, the controller 315 may detect that SR command A and SR command B are misaligned and combine the physical addresses for die N+1 from SR command A and SR command B into a read request 350 for data in die N+1. For example, if SR command A is associated with a first set of physical addresses for the first portion 370 and RS command B is associated with a second set of physical addresses for the second portion 375, the controller 315 may indicate the first set of physical addresses and the second set of physical addresses in read request 350 (as opposed to indicating the first set of physical addresses in a first read request and indicating the second set of physical addresses in a second read request).

To identify misaligned SR commands, the controller 315 may check the physical addresses associated with an SR command to determine whether the physical addresses cover a portion of a memory die. For example, if the storage capacity of a memory die is 64 kB, the controller 315 may check the physical addresses associated with an SR command to determine whether the physical addresses are for less than 64 kB (e.g., 32 kB). If the physical addresses associated with an SR command cover a portion of a memory die, the controller 315 may prefetch the next command from the queue 335 and, if the next command is an SR command, determine whether the physical addresses associated with the next command are also for the memory die. If so, the controller 315 may indicate in a read request for the memory die the physical addresses for the memory die that are associated with the misaligned SR read commands.

Thus, in a misalignment scenario involving a memory die, the controller 315 may issue a single read request for the memory die, rather than two or more read requests, which may reduce processing overhead and latency relative to other techniques, among other benefits.

Figure 4:
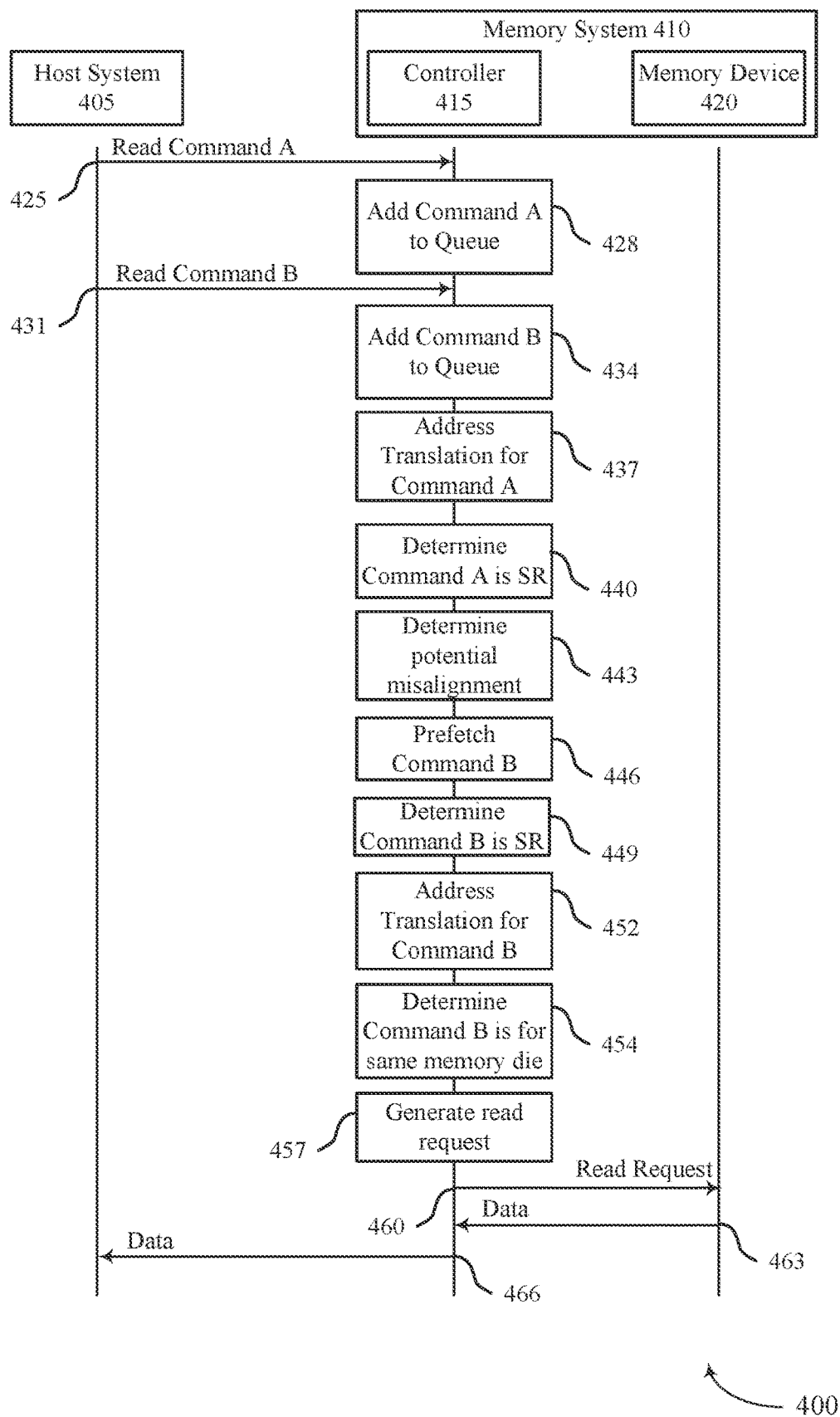
FIG. 4 illustrates an example of a process flow that supports techniques for efficiently handling misaligned sequential reads in accordance with examples as disclosed herein.

FIG. 4 illustrates an example of a process flow 400 that supports techniques for efficiently handling misaligned sequential reads in accordance with examples as disclosed herein. The process flow 400 may be implemented by a system as described herein. For example, aspects of the process flow 400 may be implemented by a host system 405 and a memory system 410. The memory system 410 may include a controller 415 and a memory device 420, which may be examples of a controller 315 and a memory device 320 as described with reference to FIG. 3. By implementing the process flow 400, a system may identify misaligned sequential read commands and issue a reduced quantity of read requests relative to other techniques.

Aspects of the process flow 400 may be implemented by one or more controllers, among other components. Additionally or alternatively, aspects of the process flow 400 may be implemented as instructions stored in memory (e.g., firmware stored in a memory coupled with the host system 305 or the memory system 310). For example, the instructions, if executed by a controller (e.g., a host system controller 106, a memory system controller 115), may cause the controller to perform the operations of the process flow 400.

At 425, a read command A may be transmitted (e.g., by the host system 405 to the memory system 410). Thus, the controller 415 may receive the read command A. The read command A may be a sequential read command that indicates multiple sets of sequential logical addresses including a first set of logical addresses. At 428, the controller 415 may add the read command A to a queue (e.g., the queue 335). At 431, the host system 405 may transmit read command B to the memory system 410. Thus, the controller 415 may receive the read command B. The read command B may be a sequential read command and may indicate multiple sets of sequential logical addresses including a second set of logical addresses. At 434, the controller 415 may add the read command B to a queue (e.g., the queue 335).

In some examples, the read command B may be received consecutively after the read command A (e.g., the read command A and the read command B may be received back-to-back with no intervening read commands).

At 437, read command A may be removed from the queue and address translation for the read command A may be performed based on (e.g., in response to) removing the read command A from the queue (e.g., by the controller 415). Address translation may refer to the process of determining the mapping between logical addresses and physical addresses. So, the controller 415 may determine a first set of physical addresses mapped to the first set of logical addresses indicated by the read command A.

At 440, the type of command for the read command A may be determined (e.g., by the controller 415). For example, the controller 415 may determine that read command A is a sequential read command. The controller 415 may determine the type of command so that the controller 415 does not waste effort trying to detect a potential misalignment for commands that are not subject to misalignment (e.g., non-sequential read commands). At 443, the controller 415 may determine that there is a potential for a misalignment involving the read command A. For example, the controller 415 may determine that the first set of physical addresses associated with the read command A cover a first portion of a memory die N+1 (as opposed to covering the entire memory die).

The controller 415 may determine that the read command A covers the first portion of the memory die N+1 based on the first set of physical addresses for the memory die N+1 having a quantity that is less than the quantity of physical addresses for the memory die N+1. For example, if the memory die N+1 has x physical addresses, the controller 415 may determine that the read command A covers the first portion of the memory die N+1 based on the first set of physical addresses for the memory die N+1 having less than x physical address. Alternatively, controller 415 may determine that the read command A covers the first portion of the memory die N+1 based on the first set of physical addresses for the memory die N+1 having a numerically last physical address that is different than the numerically last physical address for the memory die N+1.

At 446, the read command B may be prefetched based on (e.g., in response to) determining the potential misalignment (e.g., by the controller 415). For example, the controller 415 may remove the read command B from the queue. At 449, the controller 415 may determine the type of command for the read command B. For example, the controller 415 may determine that command B is a sequential read command. The controller 415 may determine the type of command so that the controller 415 does not waste effort trying to use a non-sequential read command to resolve the misalignment.

At 452, address translation for the read command B may be performed (e.g., by the controller 415). For example, the controller 415 may determine a second set of physical addresses mapped to the second set of logical addresses indicated by the read command B. The controller 415 may perform address translation for the read command B based on (e.g., in response to) removing the sequential read command B from the queue.

At 454, it may be determined that the read command B is for the same memory die as the read command A (e.g., by the controller 415). For example, the controller 415 may determine that the second set of physical addresses associated with the read command B are for a second portion of the memory die N+1. In some examples, the controller 415 may determine that the numerically first physical address in the second set of physical addresses is numerically sequential to the numerically last physical address in the first set of physical addresses.

At 457, a read request for the memory device 420 may be generated (e.g., by the controller 415). The read request may indicate (1) the first set of physical addresses associated with the sequential read command A and (2) the second set of physical addresses associated with the sequential read command B. The controller 415 may generate the read request based on (e.g., in response to) the sequential read command A and the sequential read command B being for the same memory die. Thus, controller 415 may generate a single read request for two misaligned read commands, as opposed to generating a respective read request for each of the read commands.

At 460, the read request may be transmitted (e.g., by the controller 415 to the memory device 420). At 463, in response to transmitting the read request, the controller 415 may receive the data associated with the read request (e.g., the data stored at the memory cells with the physical addresses indicated by the read request). At 470, the data may be transmitted to the host system 405.

Thus, the system may identify misaligned sequential read commands and issue a reduced quantity of read requests relative to other techniques.

Figure 5:
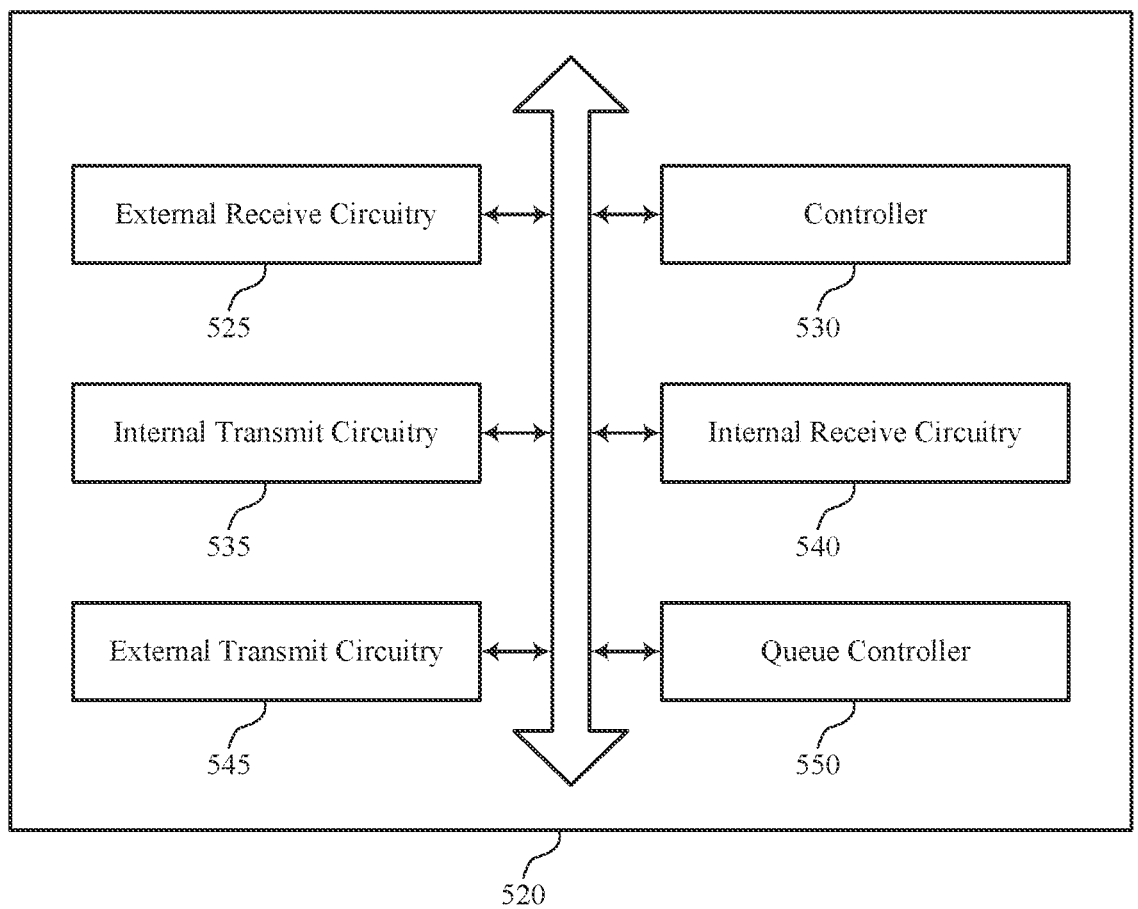
FIG. 5 shows a block diagram of a memory system that supports techniques for efficiently handling misaligned sequential reads in accordance with examples as disclosed herein.

FIG. 5 shows a block diagram 500 of a memory system 520 that supports techniques for efficiently handling misaligned sequential reads in accordance with examples as disclosed herein. The memory system 520 may be an example of aspects of a memory system as described with reference to FIGS. 1 through 4. The memory system 520, or various components thereof, may be an example of means for performing various aspects of techniques for efficiently handling misaligned sequential reads as described herein. For example, the memory system 520 may include an external receive circuitry 525, a controller 530, an internal transmit circuitry 535, an internal receive circuitry 540, an external transmit circuitry 545, a queue controller 550, or any combination thereof. Each of these components may communicate, directly or indirectly, with one another (e.g., via one or more buses).

The external receive circuitry 525 may be configured as or otherwise support a means for receiving, at the memory system, a first read command and a second read command from a host system, the first read command associated with a first set of physical addresses and the second read command associated with a second set of physical addresses. The controller 530 may be configured as or otherwise support a means for determining, based at least in part on the first set of physical addresses and the second set of physical addresses, that the first read command and the second read command are for a same memory die of a plurality of memory dies included in a memory device of the memory system. The internal transmit circuitry 535 may be configured as or otherwise support a means for transmitting a read request to retrieve data associated with the first read command and the second read command from the memory die, the memory die including the first set of physical addresses associated with the first read command and the second set of physical addresses associated with the second read command.

In some examples, the internal receive circuitry 540 may be configured as or otherwise support a means for receiving, based at least in part on transmitting the read request, the data associated with the first set of physical addresses and the second set of physical addresses. In some examples, the external transmit circuitry 545 may be configured as or otherwise support a means for transmitting the data to the host system based at least in part on receiving the first read command and the second read command.

In some examples, to support determining that the first read command and the second read command are for the same memory die, the controller 530 may be configured as or otherwise support a means for determining that the first set of physical addresses associated with the first read command and the second set of physical addresses associated with the second read command are for the same memory die.

In some examples, the controller 530 may be configured as or otherwise support a means for determining that the first set of physical addresses associated with the first read command are for a first portion of the memory die. In some examples, the controller 530 may be configured as or otherwise support a means for determining the second set of physical addresses associated with the second read command are for a second portion of the memory die based at least in part on determining that the first set of physical addresses associated with the first read command, where determining that the first read command and the second read command are for the same memory die is based at least in part on the determination.

In some examples, the queue controller 550 may be configured as or otherwise support a means for removing the second read command from a queue based at least in part on determining that the first set of physical addresses associated with the first read command are for the first portion of the memory die. In some examples, the controller 530 may be configured as or otherwise support a means for determining that a set of logical addresses included in the second read command are mapped to the second set of physical addresses based at least in part on removing the second read command from the queue.

In some examples, the controller 530 may be configured as or otherwise support a means for determining that the first read command and the second read command are part of reading from numerically sequential logical addresses, where determining that the first read command and the second read command are for the same memory die is based at least in part on the first read command and the second read command being part of reading from the numerically sequential logical addresses.

In some examples, the controller 530 may be configured as or otherwise support a means for determining that the first read command includes a first set of logical addresses that are numerically sequential. In some examples, the controller 530 may be configured as or otherwise support a means for determining that the second read command includes a second set of logical addresses that are numerically sequential, where determining that the first read command and the second read command are for the same memory die is based at least in part on the first set of logical addresses and the second set of logical addresses being numerically sequential.

In some examples, the controller 530 may be configured as or otherwise support a means for determining that the first read command and the second read command are of a first type. In some examples, the controller 530 may be configured as or otherwise support a means for determining that the first read command and the second read command are part of reading from the numerically sequential logical addresses. In some examples, the controller 530 may be configured as or otherwise support a means for determining the second set of physical addresses associated with the second read command based at least in part on the first read command and the second read command being of the first type and being part of reading from the numerically sequential logical addresses.

In some examples, the controller 530 may be configured as or otherwise support a means for determining that the first set of physical addresses associated with the first read command are for a portion of the memory die, where the second set of physical addresses is determined based at least in part on the first set of physical addresses being for the portion of the memory die.

In some examples, the first read command is associated with multiple memory dies. In some examples, the second read command is associated with multiple memory dies.

In some examples, the first read command indicates a first set of logical addresses and the second read command indicates a second set of logical addresses, and the controller 530 may be configured as or otherwise support a means for determining the first set of physical addresses mapped to the first set of logical addresses. In some examples, the first read command indicates a first set of logical addresses and the second read command indicates a second set of logical addresses, and the controller 530 may be configured as or otherwise support a means for determining the second set of physical addresses mapped to the second set of logical addresses.

In some examples, the queue controller 550 may be configured as or otherwise support a means for storing the first read command and the second read command in a queue based at least in part on receiving the first read command and the second read command. In some examples, the queue controller 550 may be configured as or otherwise support a means for removing the first read command from the queue for processing. In some examples, the controller 530 may be configured as or otherwise support a means for determining the first set of physical addresses based at least in part on removing the first read command from the queue. In some examples, the queue controller 550 may be configured as or otherwise support a means for removing the second read command from the queue based at least in part on the first set of physical addresses being for a first portion of the memory die. In some examples, the controller 530 may be configured as or otherwise support a means for determining that at least a portion of the second set of physical addresses are for a second portion of the memory die based at least in part on removing the second read command from the queue.

Figure 6:
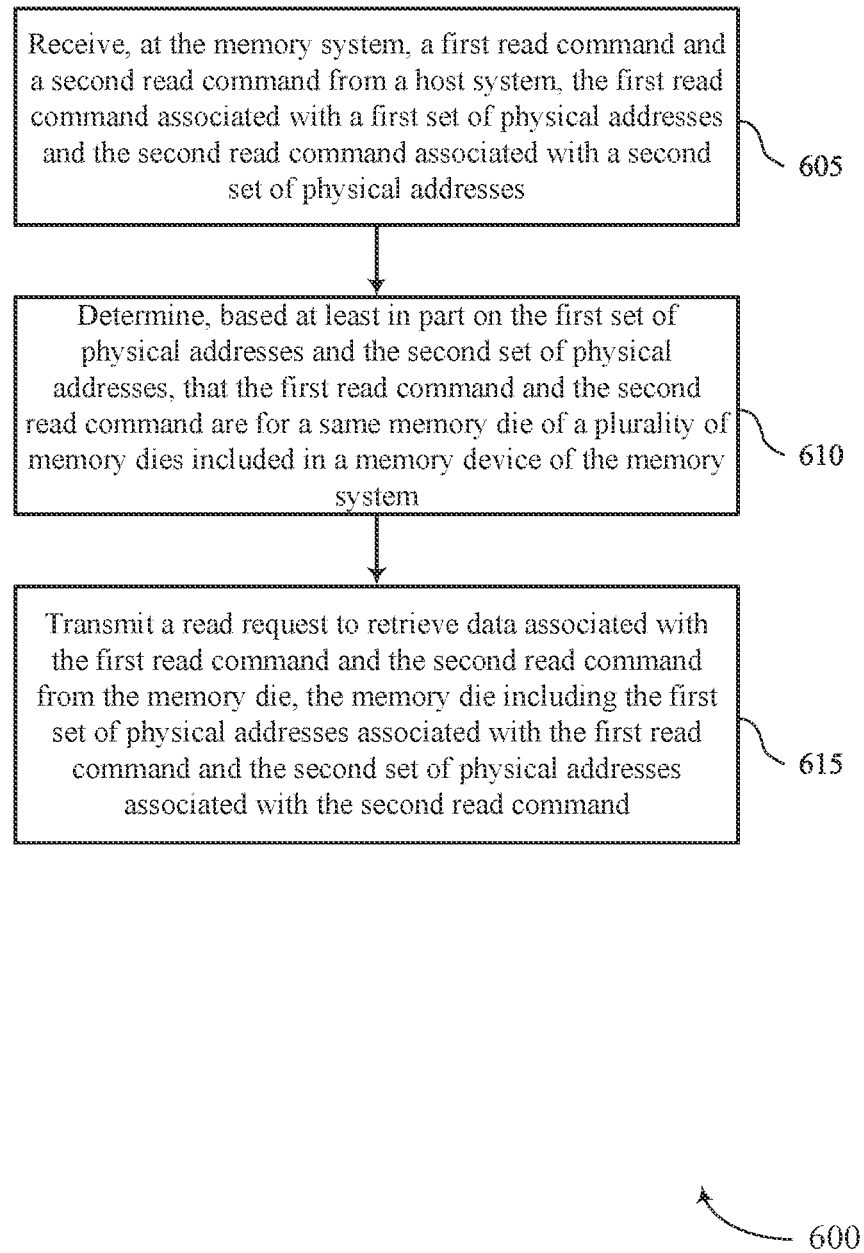
FIG. 6 shows a flowchart illustrating a method or methods that support techniques for efficiently handling misaligned sequential reads in accordance with examples as disclosed herein.

FIG. 6 shows a flowchart illustrating a method 600 that supports techniques for efficiently handling misaligned sequential reads in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving, at the memory system, a first read command and a second read command from a host system, the first read command associated with a first set of physical addresses and the second read command associated with a second set of physical addresses. The operations of 605 may be performed in accordance with examples as disclosed herein. In some examples, aspects of the operations of 605 may be performed by an external receive circuitry 525 as described with reference to FIG. 5.

At 610, the method may include determining, based at least in part on the first set of physical addresses and the second set of physical addresses, that the first read command and the second read command are for a same memory die of a plurality of memory dies included in a memory device of the memory system. The operations of 610 may be performed in accordance with examples as disclosed herein. In some examples, aspects of the operations of 610 may be performed by a controller 530 as described with reference to FIG. 5.

At 615, the method may include transmitting a read request to retrieve data associated with the first read command and the second read command from the memory die, the memory die including the first set of physical addresses associated with the first read command and the second set of physical addresses associated with the second read command. The operations of 615 may be performed in accordance with examples as disclosed herein. In some examples, aspects of the operations of 615 may be performed by an internal transmit circuitry 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at the memory system, a first read command and a second read command from a host system, the first read command associated with a first set of physical addresses and the second read command associated with a second set of physical addresses; determining, based at least in part on the first set of physical addresses and the second set of physical addresses, that the first read command and the second read command are for a same memory die of a plurality of memory dies included in a memory device of the memory system; and transmitting a read request to retrieve data associated with the first read command and the second read command from the memory die, the memory die including the first set of physical addresses associated with the first read command and the second set of physical addresses associated with the second read command.

Aspect 2: The method, apparatus, or non-transitory computer-readable medium of aspect 1, further including operations, features, circuitry, logic, means, or instructions, or any combination thereof for receiving, based at least in part on transmitting the read request, the data associated with the first set of physical addresses and the second set of physical addresses and transmitting the data to the host system based at least in part on receiving the first read command and the second read command.

Aspect 3: The method, apparatus, or non-transitory computer-readable medium of any of aspects 1 through 2 where determining that the first read command and the second read command are for the same memory die includes operations, features, circuitry, logic, means, or instructions, or any combination thereof for determining that the first set of physical addresses associated with the first read command and the second set of physical addresses associated with the second read command are for the same memory die.

Aspect 4: The method, apparatus, or non-transitory computer-readable medium of any of aspects 1 through 3, further including operations, features, circuitry, logic, means, or instructions, or any combination thereof for determining that the first set of physical addresses associated with the first read command are for a first portion of the memory die and determining the second set of physical addresses associated with the second read command are for a second portion of the memory die based at least in part on determining that the first set of physical addresses associated with the first read command, where determining that the first read command and the second read command are for the same memory die is based at least in part on the determination.

Aspect 5: The method, apparatus, or non-transitory computer-readable medium of aspect 4, further including operations, features, circuitry, logic, means, or instructions, or any combination thereof for removing the second read command from a queue based at least in part on determining that the first set of physical addresses associated with the first read command are for the first portion of the memory die and determining that a set of logical addresses included in the second read command are mapped to the second set of physical addresses based at least in part on removing the second read command from the queue.

Aspect 6: The method, apparatus, or non-transitory computer-readable medium of any of aspects 1 through 5, further including operations, features, circuitry, logic, means, or instructions, or any combination thereof for determining that the first read command and the second read command are part of reading from numerically sequential logical addresses, where determining that the first read command and the second read command are for the same memory die is based at least in part on the first read command and the second read command being part of reading from the numerically sequential logical addresses.

Aspect 7: The method, apparatus, or non-transitory computer-readable medium of any of aspects 1 through 6, further including operations, features, circuitry, logic, means, or instructions, or any combination thereof for determining that the first read command includes a first set of logical addresses that are numerically sequential and determining that the second read command includes a second set of logical addresses that are numerically sequential, where determining that the first read command and the second read command are for the same memory die is based at least in part on the first set of logical addresses and the second set of logical addresses being numerically sequential.

Aspect 8: The method, apparatus, or non-transitory computer-readable medium of any of aspects 1 through 7, further including operations, features, circuitry, logic, means, or instructions, or any combination thereof for determining that the first read command and the second read command are of a first type; determining that the first read command and the second read command are part of reading from the numerically sequential logical addresses; and determining the second set of physical addresses associated with the second read command based at least in part on the first read command and the second read command being of the first type and being part of reading from the numerically sequential logical addresses.

Aspect 9: The method, apparatus, or non-transitory computer-readable medium of aspect 8, further including operations, features, circuitry, logic, means, or instructions, or any combination thereof for determining that the first set of physical addresses associated with the first read command are for a portion of the memory die, where the second set of physical addresses is determined based at least in part on the first set of physical addresses being for the portion of the memory die.

Aspect 10: The method, apparatus, or non-transitory computer-readable medium of any of aspects 1 through 9 where the first read command is associated with multiple memory dies and the second read command is associated with multiple memory dies.

Aspect 11: The method, apparatus, or non-transitory computer-readable medium of any of aspects 1 through 10 where the first read command indicates a first set of logical addresses and the second read command indicates a second set of logical addresses and the method, apparatuses, and non-transitory computer-readable medium, further includes operations, features, circuitry, logic, means, or instructions, or any combination thereof for determining the first set of physical addresses mapped to the first set of logical addresses and determining the second set of physical addresses mapped to the second set of logical addresses.

Aspect 12: The method, apparatus, or non-transitory computer-readable medium of any of aspects 1 through 11, further including operations, features, circuitry, logic, means, or instructions, or any combination thereof for storing the first read command and the second read command in a queue based at least in part on receiving the first read command and the second read command; removing the first read command from the queue for processing; determining the first set of physical addresses based at least in part on removing the first read command from the queue; removing the second read command from the queue based at least in part on the first set of physical addresses being for a first portion of the memory die; and determining that at least a portion of the second set of physical addresses are for a second portion of the memory die based at least in part on removing the second read command from the queue.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 13: An apparatus, including: a memory system including a memory device that includes a plurality of memory dies; and a controller coupled with the memory device and configured to cause the apparatus to: receive a first read command and a second read command from a host system, the first read command associated with a first set of physical addresses and the second read command associated with a second set of physical addresses; determine, based at least in part on the first set of physical addresses and the second set of physical addresses, that the first read command and the second read command are for a same memory die of the plurality of memory dies; and transmit a read request to retrieve data associated with the first read command and the second read command from the memory die, the memory die including the first set of physical addresses associated with the first read command and the second set of physical addresses associated with the second read command.

Aspect 14: The apparatus of aspect 13, where the controller is further configured to cause the apparatus to: receive, based at least in part on transmitting the read request, the data associated with the first set of physical addresses and the second set of physical addresses; and transmit the data to the host system based at least in part on receiving the first read command and the second read command.

Aspect 15: The apparatus of any of aspects 13 through 14, where the controller is further configured to cause the apparatus to determine that the first read command and the second read command are for the same memory die by being configured to cause the apparatus to: determine that the first set of physical addresses associated with the first read command and the second set of physical addresses associated with the second read command are for the same memory die.

Aspect 16: The apparatus of any of aspects 13 through 15, where the controller is further configured to cause the apparatus to: determine that the first set of physical addresses associated with the first read command are for a first portion of the memory die; and determine the second set of physical addresses associated with the second read command are for a second portion of the memory die based at least in part on determining that the first set of physical addresses associated with the first read command, where determining that the first read command and the second read command are for the same memory die is based at least in part on the determination.

Aspect 17: The apparatus of aspect 16, where the controller is further configured to cause the apparatus to: remove the second read command from a queue based at least in part on determining that the first set of physical addresses associated with the first read command are for the first portion of the memory die; and determine that a set of logical addresses included in the second read command are mapped to the second set of physical addresses based at least in part on removing the second read command from the queue.

Aspect 18: The apparatus of any of aspects 13 through 17, where the controller is further configured to cause the apparatus to: determine that the first read command and the second read command are part of reading from numerically sequential logical addresses, where determining that the first read command and the second read command are for the same memory die is based at least in part on the first read command and the second read command being part of reading from the numerically sequential logical addresses.

Aspect 19: The apparatus of any of aspects 13 through 18, where the controller is further configured to cause the apparatus to: determine that the first read command includes a first set of logical addresses that are numerically sequential; and determine that the second read command includes a second set of logical addresses that are numerically sequential, where determining that the first read command and the second read command are for the same memory die is based at least in part on the first set of logical addresses and the second set of logical addresses being numerically sequential.

Aspect 20: The apparatus of any of aspects 13 through 19, where the controller is further configured to cause the apparatus to: determine that the first read command and the second read command are of a first type; determine that the first read command and the second read command are part of reading from the numerically sequential logical addresses; and determine the second set of physical addresses associated with the second read command based at least in part on the first read command and the second read command being of the first type and being part of reading from the numerically sequential logical addresses.

Aspect 21: The apparatus of aspect 20, where the controller is further configured to cause the apparatus to: determine that the first set of physical addresses associated with the first read command are for a portion of the memory die, where the second set of physical addresses is determined based at least in part on the first set of physical addresses being for the portion of the memory die.

Aspect 22: The apparatus of any of aspects 13 through 21, where the first read command is associated with multiple memory dies, and the second read command is associated with multiple memory dies.

Aspect 23: The apparatus of any of aspects 13 through 22, where the first read command indicates a first set of logical addresses and the second read command indicates a second set of logical addresses, and where the controller is further configured to cause the apparatus to: determine the first set of physical addresses mapped to the first set of logical addresses; and determine the second set of physical addresses mapped to the second set of logical addresses.

Aspect 24: The apparatus of any of aspects 13 through 23, where the controller is further configured to cause the apparatus to: store the first read command and the second read command in a queue based at least in part on receiving the first read command and the second read command; remove the first read command from the queue for processing; determine the first set of physical addresses based at least in part on removing the first read command from the queue; remove the second read command from the queue based at least in part on the first set of physical addresses being for a first portion of the memory die; and determine that at least a portion of the second set of physical addresses are for a second portion of the memory die based at least in part on removing the second read command from the queue.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
  a memory system comprising a memory device that includes a plurality of memory dies; and
  a controller coupled with the memory device and configured to cause the apparatus to:
  receive a first read command and a second read command from a host system, the first read command associated with a first set of physical addresses and the second read command associated with a second set of physical addresses, wherein the first read command indicates a first set of logical addresses that are numerically sequential and the second read command indicates a second set of logical addresses that are numerically sequential;
  determine, based at least in part on a total quantity of physical addresses included in both the first set of physical addresses and the second set of physical addresses being less than or equal to a second quantity of physical addresses included in a memory die of the plurality of memory dies, that the first read command and the second read command are both for the memory die, wherein the first set of physical addresses are for a first portion of the memory die and the second set of physical addresses are for a second portion of the memory die; and
  transmit, based at least in part on the first read command and the second read command both being associated with the memory die, a single read request to retrieve data associated with both the first read command and the second read command from the memory die, the memory die including the first set of physical addresses associated with the first read command and the second set of physical addresses associated with the second read command.

2. The apparatus of claim 1, wherein the controller is further configured to cause the apparatus to:
  receive, based at least in part on transmitting the single read request, the data associated with the first set of physical addresses and the second set of physical addresses; and
  transmit the data to the host system based at least in part on receiving the first read command and the second read command.

3. The apparatus of claim 1, wherein the controller is further configured to cause the apparatus to determine that the first read command and the second read command are for the memory die by being configured to cause the apparatus to:
  compare the total quantity of physical addresses associated with the first read command and the second read command with the second quantity of physical addresses associated with the memory die.

4. The apparatus of claim 1, wherein the controller is further configured to cause the apparatus to:
  determine that the first set of physical addresses associated with the first read command are for the first portion of the memory die; and
  determine the second set of physical addresses associated with the second read command are for the second portion of the memory die based at least in part on determining that the first set of physical addresses associated with the first read command are for the first portion of the memory die, wherein determining that the first read command and the second read command are for the memory die is based at least in part on the determination.

5. The apparatus of claim 4, wherein the controller is further configured to cause the apparatus to:
  remove the second read command from a queue based at least in part on determining that the first set of physical addresses associated with the first read command are for the first portion of the memory die; and
  determine that a set of logical addresses included in the second read command are mapped to the second set of physical addresses based at least in part on removing the second read command from the queue.

6. The apparatus of claim 1, wherein the controller is further configured to cause the apparatus to:
  determine that the first read command and the second read command are part of reading from a set of numerically sequential logical addresses, wherein determining that the first read command and the second read command are for the memory die is based at least in part on the first read command and the second read command being part of reading from the set of numerically sequential logical addresses.

7. The apparatus of claim 1, wherein
  determining that the first read command and the second read command are for the memory die is based at least in part on the first set of logical addresses and the second set of logical addresses being numerically sequential.

8. The apparatus of claim 1, wherein the controller is further configured to cause the apparatus to:
  determine that the first read command and the second read command are of a first type;
  determine that the first read command and the second read command are part of reading from a set of numerically sequential logical addresses; and
  determine the second set of physical addresses associated with the second read command based at least in part on the first read command and the second read command being of the first type and being part of reading from the set of numerically sequential logical addresses.

9. The apparatus of claim 8, wherein the controller is further configured to cause the apparatus to:

determine that the first set of physical addresses associated with the first read command are for the first portion of the memory die, wherein the second set of physical addresses is determined based at least in part on the first set of physical addresses being for the first portion of the memory die.

10. The apparatus of claim 1, wherein the first read command indicates the first set of logical addresses and the second read command indicates the second set of logical addresses, and wherein the controller is further configured to cause the apparatus to:
determine the first set of physical addresses mapped to the first set of logical addresses; and
determine the second set of physical addresses mapped to the second set of logical addresses.

11. The apparatus of claim 1, wherein the controller is further configured to cause the apparatus to:
store the first read command and the second read command in a queue based at least in part on receiving the first read command and the second read command;
remove the first read command from the queue for processing;
determine the first set of physical addresses based at least in part on removing the first read command from the queue;
remove the second read command from the queue based at least in part on the first set of physical addresses being for the first portion of the memory die; and
determine that at least a portion of the second set of physical addresses are for the second portion of the memory die based at least in part on removing the second read command from the queue.

12. A non-transitory computer-readable medium storing code comprising instructions which, when executed by a processor of a memory system, cause the memory system to:
receive a first read command and a second read command from a host system, the first read command associated with a first set of physical addresses and the second read command associated with a second set of physical addresses, wherein the first read command indicates a first set of logical addresses that are numerically sequential and the second read command indicates a second set of logical addresses that are numerically sequential;
determine, based at least in part on a total quantity of physical addresses included in both the first set of physical addresses and the second set of physical addresses being less than or equal to a second quantity of physical addresses included in a memory die of a plurality of memory dies included in a memory device of the memory system, that the first read command and the second read command are both for the memory die, wherein the first set of physical addresses are for a first portion of the memory die and the second set of physical addresses are for a second portion of the memory die; and
transmit, based at least in part on the first read command and the second read command both being associated with the memory die, a single read request to retrieve data associated with both the first read command and the second read command from the memory die, the memory die including the first set of physical addresses associated with the first read command and the second set of physical addresses associated with the second read command.

13. The non-transitory computer-readable medium of claim 12, wherein the instructions, when executed by the processor of the memory system, further cause the memory system to:
receive, based at least in part on transmitting the single read request, the data associated with the first set of physical addresses and the second set of physical addresses; and
transmit the data to the host system based at least in part on receiving the first read command and the second read command.

14. The non-transitory computer-readable medium of claim 12, wherein the instructions executable by the processor to determine that the first read command and the second read command are for the memory die are further executable by the processor to cause the memory system to:
compare the total quantity of physical addresses associated with the first read command and the second read command with the second quantity of physical addresses associated with the memory die.

15. The non-transitory computer-readable medium of claim 12, wherein the instructions, when executed by the processor of the memory system, further cause the memory system to:
determine that the first set of physical addresses associated with the first read command are for the first portion of the memory die; and
determine the second set of physical addresses associated with the second read command are for the second portion of the memory die based at least in part on determining that the first set of physical addresses associated with the first read command are for the first portion of the memory die, wherein determining that the first read command and the second read command are for the memory die is based at least in part on the determination.

16. The non-transitory computer-readable medium of claim 15, wherein the instructions, when executed by the processor of the memory system, further cause the memory system to:
remove the second read command from a queue based at least in part on determining that the first set of physical addresses associated with the first read command are for the first portion of the memory die; and
determine that the second set of logical addresses included in the second read command are mapped to the second set of physical addresses based at least in part on removing the second read command from the queue.

17. The non-transitory computer-readable medium of claim 12, wherein the instructions, when executed by the processor of the memory system, further cause the memory system to:
determine that the first read command and the second read command are part of reading from a set of numerically sequential logical addresses, wherein determining that the first read command and the second read command are for the memory die is based at least in part on the first read command and the second read command being part of reading from the set of numerically sequential logical addresses.

18. The non-transitory computer-readable medium of claim 12, wherein the instructions, when executed by the processor of the memory system,
wherein determining that the first read command and the second read command are for the memory die is based at least in part on the first set of logical addresses and the second set of logical addresses being numerically sequential.

19. The non-transitory computer-readable medium of claim 12, wherein the instructions, when executed by the processor of the memory system, further cause the memory system to:
- determine that the first read command and the second read command are of a first type;
- determine that the first read command and the second read command are part of reading from a set of numerically sequential logical addresses; and
- determine the second set of physical addresses associated with the second read command based at least in part on the first read command and the second read command being of the first type and being part of reading from the set of numerically sequential logical addresses.

20. The non-transitory computer-readable medium of claim 19, wherein the instructions, when executed by the processor of the memory system, further cause the memory system to:
- determine that the first set of physical addresses associated with the first read command are for the first portion of the memory die, wherein the second set of physical addresses is determined based at least in part on the first set of physical addresses being for the first portion of the memory die.

21. A method at a memory system, comprising:
- receiving, at the memory system, a first read command and a second read command from a host system, the first read command associated with a first set of physical addresses and the second read command associated with a second set of physical addresses, wherein the first read command indicates a first set of logical addresses that are numerically sequential and the second read command indicates a second set of logical addresses that are numerically sequential;
- determining, based at least in part on a total quantity of physical addresses included in both the first set of physical addresses and the second set of physical addresses being less than or equal to a second quantity of physical addresses included in a memory die of a plurality of memory dies included in a memory device of the memory system, that the first read command and the second read command are for the memory die, wherein the first set of physical addresses are for a first portion of the memory die and the second set of physical addresses are for a second portion of the memory die; and
- transmitting, based at least in part on the first read command and the second read command both being associated with the memory die, a single read request to retrieve data associated with both the first read command and the second read command from the memory die, the memory die including the first set of physical addresses associated with the first read command and the second set of physical addresses associated with the second read command.

22. The method of claim 21, further comprising:
- receiving, based at least in part on transmitting the single read request, the data associated with the first set of physical addresses and the second set of physical addresses; and
- transmitting the data to the host system based at least in part on receiving the first read command and the second read command.

23. The method of claim 21, wherein determining that the first read command and the second read command are for the memory die comprises:
- comparing the total quantity of physical addresses associated with the first read command and the second read command with the second quantity of physical addresses associated with the memory die.

24. The method of claim 21, further comprising:
- determining that the first set of physical addresses associated with the first read command are for the first portion of the memory die; and
- determining the second set of physical addresses associated with the second read command are for the second portion of the memory die based at least in part on determining that the first set of physical addresses associated with the first read command are for the first portion of the memory die, wherein determining that the first read command and the second read command are for the memory die is based at least in part on the determination.

25. The method of claim 24, further comprising:
- removing the second read command from a queue based at least in part on determining that the first set of physical addresses associated with the first read command are for the first portion of the memory die; and
- determining that the second set of logical addresses included in the second read command are mapped to the second set of physical addresses based at least in part on removing the second read command from the queue.

26. The method of claim 21, further comprising:
- determining that the first read command and the second read command are part of reading from a set of numerically sequential logical addresses, wherein determining that the first read command and the second read command are for the memory die is based at least in part on the first read command and the second read command being part of reading from the set of numerically sequential logical addresses.

* * * * *